S. H. PECKHAM.
Tobacco-Hangers.

No. 150,604.

Patented May 5, 1874.

UNITED STATES PATENT OFFICE.

SAMUEL H. PECKHAM, OF MIDDLEFIELD, CONNECTICUT.

IMPROVEMENT IN TOBACCO-HANGERS.

Specification forming part of Letters Patent No. 150,604, dated May 5, 1874; application filed October 17, 1873.

*To all whom it may concern:*

Be it known that I, SAMUEL H. PECKHAM, of Middlefield, in the county of Middlesex and State of Connecticut, have invented a new Improvement in Tobacco-Hanger; and I do hereby declare the following, when taken in connection with the accompanying drawings and the letters of reference marked thereon, to be a full, clear, and exact description of the same, and which said drawings constitute part of this specification, and represent, in—

Figure 1:
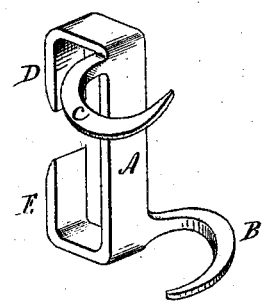
Figure 2:
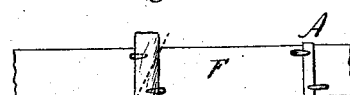
Figure 2:
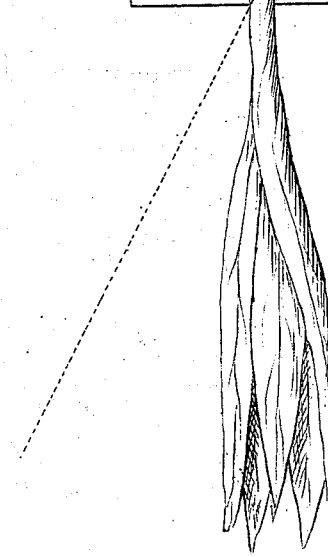

Figure 1, a perspective view of the hanger; Fig. 2, a front view of the hanger, as applied to the lath, and to illustrate the manner of hanging the plants.

This invention relates to an improvement in device to be attached to the laths in tobacco-drying houses, by which the plants are to be suspended; and it consists in a base, having two hooks, the one above the other, one turning to the right, the other to the left, so that the open side of one will face the open side of the other, so that the two will enter the stalk upon opposite sides, and the base provided with means for attachment to the lath.

A is the base, B the lower hook, and C the upper hook—these two hooks formed on opposite sides of the base, one turning to the right and the other to the left, as seen in Fig. 1, so that the open sides of both are upon the in or base side. The hooks are made sharp at the point, so as to easily penetrate the plant. The base is provided with spikes, by which to attach it to the lath, or may be formed, as seen in Fig 1, the ends bent back, as at D E, so as to form a loop to pass over the lath. F, Fig. 2, represents the lath with two of the hangers attached. The points of the two hooks are formed so that the point of one comes nearly over the point of the other.

To hang the plants, they are presented between the hooks at an angle, as denoted by the broken lines in Fig. 2, so that the plant passes freely in, then brought down to a vertical position the hooks enter or grasp the plant upon opposite sides and firmly attach it to the lath.

To remove the plants it is required simply to turn the plant from the open side of the lower hook, as seen in Fig. 2, which takes it from both hooks, and it may be drawn out between the two.

I claim as my invention—

The herein-described tobacco-hanger, consisting of the base A, the hooks B C, one above the other, in the relative position to each other, as shown, so that the two enter the stalk upon opposite sides, and the base, provided with means of attachment to the lath, substantially as described.

SAMUEL H. PECKHAM.

Witnesses:
LYMAN A. MILLS,
WM. P. RICHARDSON.